(12) United States Patent
Cai

(10) Patent No.: US 8,102,981 B2
(45) Date of Patent: Jan. 24, 2012

(54) ALERTING FOR LONG DURATION SESSIONS IN COMMUNICATION NETWORKS

(75) Inventor: Yigang Cai, Naperville, IL (US)

(73) Assignee: Alcatel Lucent, Paris (FR)

( * ) Notice: Subject to any disclaimer, the term of this patent is extended or adjusted under 35 U.S.C. 154(b) by 1380 days.

(21) Appl. No.: 11/422,009

(22) Filed: Jun. 2, 2006

(65) Prior Publication Data

US 2007/0280455 A1 Dec. 6, 2007

(51) Int. Cl.
*H04M 15/00* (2006.01)
(52) U.S. Cl. .............................. 379/114.14; 379/127.02
(58) Field of Classification Search .............. 379/114.01, 379/114.14, 114.28, 127.02, 188; 455/405–408
See application file for complete search history.

(56) References Cited

U.S. PATENT DOCUMENTS

| | | | | |
|---|---|---|---|---|
| 5,517,555 | A * | 5/1996 | Amadon et al. | 455/408 |
| 5,677,945 | A * | 10/1997 | Mullins et al. | 379/114.17 |
| 6,597,774 | B1 * | 7/2003 | Jennings et al. | 379/114.07 |
| 6,633,768 | B2 * | 10/2003 | Hurme et al. | 455/565 |
| 6,665,387 | B2 * | 12/2003 | Hannu | 379/114.16 |
| 6,760,418 | B1 * | 7/2004 | Abbasi et al. | 379/115.01 |
| 7,072,638 | B2 * | 7/2006 | Benco et al. | 455/405 |
| 2003/0084184 | A1 | 5/2003 | Eggleston et al. | |

OTHER PUBLICATIONS

Cai et al., "IP Multimedia Subsystem Online Session Charging Call Control" Bell Labs Technology, Bell Laboratories, Murray Hill, NJ, US, vol. 4, No. 10, Jan. 1, 2006, pp. 117-132.
Yi-Bing-Lin et al., "Mobile Prepaid Phone Services" IEEE Personal Communications, Jun. 2000, pp. 6-14.

* cited by examiner

*Primary Examiner* — Quoc D Tran
(74) *Attorney, Agent, or Firm* — Duft Bornsen & Fishman LLP

(57) ABSTRACT

Communication networks and associated methods and systems are disclosed that provide duration alerting for communication sessions to subscribers. A communication network of the invention comprises a charging system and a network management system. The charging system receives charging information from at least one network node serving a session for a subscriber. The charging system monitors a duration of the session based on the charging information, and processes filter criteria and the duration of the session to determine whether to provide duration alerting for the session. If the charging system determines that duration alerting is proper based on the filter criteria, then the charging system transmits duration alerting information to the network management system. The network management system receives the duration alerting information, and transmits a duration alerting message to the subscriber.

20 Claims, 5 Drawing Sheets

ALERTING FOR LONG DURATION SESSIONS IN COMMUNICATION NETWORKS

BACKGROUND OF THE INVENTION

1. Field of the Invention

The invention is related to the field of communications and, in particular, to providing alerting to subscribers of long duration sessions in communication networks.

2. Statement of the Problem

One type of communication network gaining popularity is an IP Multimedia Subsystem (IMS) network. As set forth in the $3^{rd}$ Generation Partnership Project (3GPP), IMS provides a common core network having access-agnostic network architecture for converged networks. Service providers are accepting this architecture in next generation network evolution. The IMS architecture is initially defined by the 3GPP to provide multimedia services to mobile subscribers over an Internet Protocol (IP) network. IP networks have become the most cost savings bearer network to transmit video, voice, and data. IMS uses the advantage of IP networks to provide multimedia services for IMS subscribers on an IMS platform. The signaling used within IMS networks is Session Initiation Protocol (SIP). IMS defines the standard SIP interface between application servers, the IMS core network (CSCF), the IMS subscriber, the IMS database (HSS), and IMS billing elements. These standards can reduce the network integration costs and let the subscriber enjoy more stable services.

IMS sessions may be established for a variety of reasons, such as voice calls, IP TV, IP movies, online gaming, etc. Unlike traditional telephony calls, IMS sessions such as these may have long durations, such as days, weeks, or months. A long duration IMS session may be intentional by the subscriber, such as if he/she is playing an online game for an extended period of time. The long duration IMS session may also be unintentional where the subscriber forgets to log off of the session. In either case, long duration IMS sessions can be costly to the user if they are billed on a time basis.

One problem with present IMS networks is that subscribers are only notified of long duration sessions in a billing invoice (e.g., a monthly billing invoice) that itemizes the IMS sessions during a billing period. Unfortunately, the subscriber may receive a billing invoice having very high and unexpected costs due to one or more long duration IMS sessions.

SUMMARY OF THE SOLUTION

The invention solves the above and other problems by providing duration alerting in communication networks, such as IMS networks, to alert a subscriber of long duration sessions. The duration alerting allows a subscriber to monitor communication sessions in substantially real-time instead of having to wait for a billing invoice to monitor the sessions. When time-based billing is applied to sessions, subscribers may advantageously avoid costly long duration sessions through the duration alerting.

In one example, a subscriber may define a time or cost threshold for communication sessions. If the time or cost threshold is met for a particular session, then the communication network provides duration alerting to the subscriber so that the subscriber may end the session. In another example, if a subscriber forgets to log off of an IMS session, then an IMS network will alert the subscriber of a long duration session. The subscriber may then log off of the session to avoid being continually charged for the session. In another example, parents may monitor and control the communication sessions of their children. If a child is on a long duration session, then the communication network will alert the parents of the long duration session.

In one embodiment of the invention, a communication network adapted to provide duration alerting includes a charging system and a network management system. The charging system is adapted to receive charging information from at least one network node serving a communication session for a subscriber. The charging system is further adapted to monitor a duration of the session based on the charging information, and process filter criteria and the duration of the session to determine whether to provide duration alerting for the session. If the charging system determines that duration alerting is proper based on the filter criteria, then the charging system transmits duration alerting information to the network management system. The network management system is adapted to receive the duration alerting information, and transmit a duration alerting message to the subscriber.

The network management system may be further adapted to transmit a query to a subscriber database responsive to receiving the duration alerting information to identify a type of duration alerting to provide to the subscriber. The type of duration alerting may comprise a voice mail message, a text/multimedia message, an email message, an interactive voice message, etc. The network management system may be further adapted to receive a response from the subscriber database indicating the type of duration alerting to provide, and transmit the duration alerting message to the subscriber according to the indicated type of duration alerting.

The invention may include other exemplary embodiments described below.

DESCRIPTION OF THE DRAWINGS

The same reference number represents the same element or the same type of element on all drawings.

DETAILED DESCRIPTION OF THE INVENTION

FIGS. 1-5 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
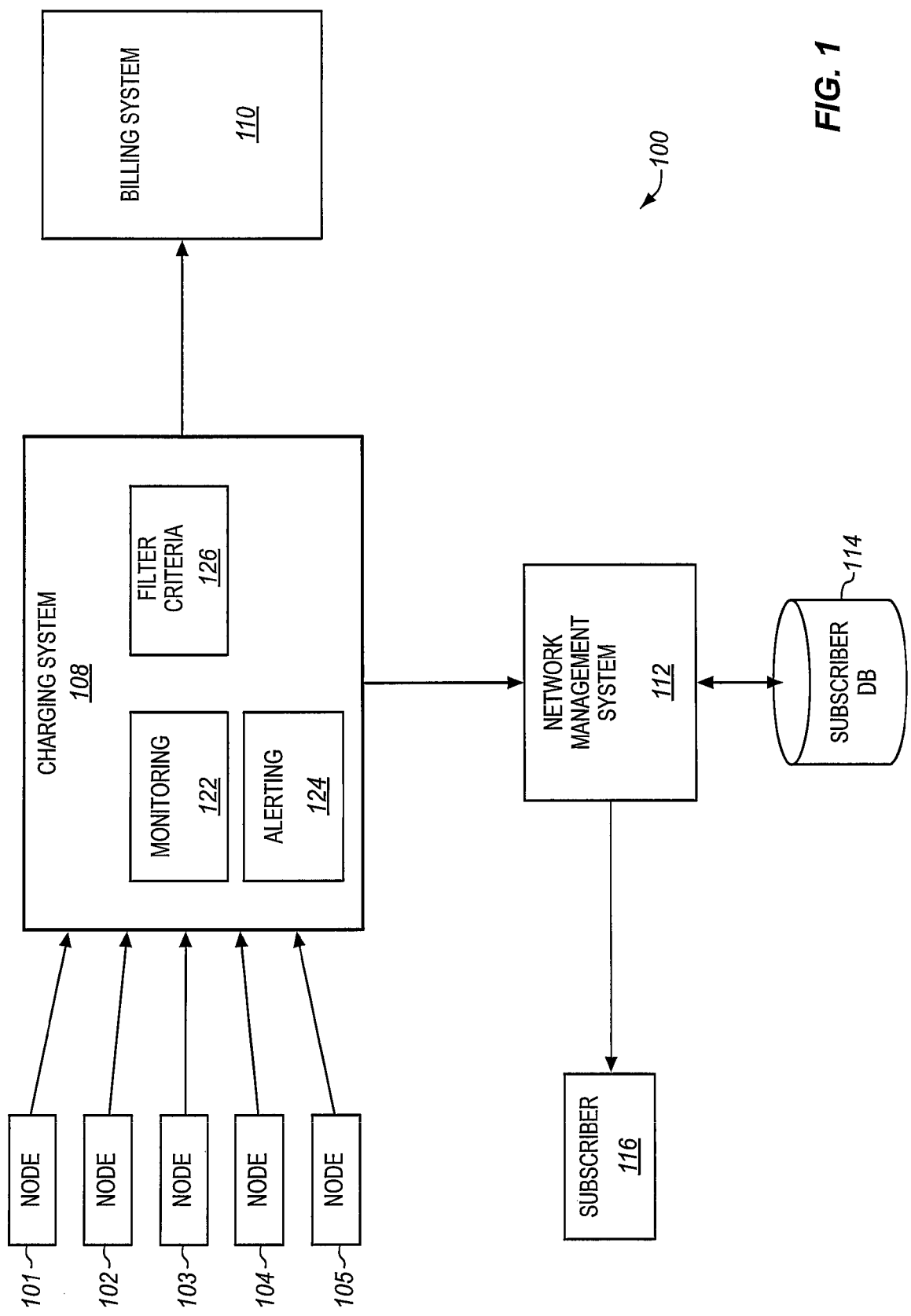
FIG. 1 illustrates a communication network in an exemplary embodiment of the invention.

FIG. 1 illustrates a communication network 100 in an exemplary embodiment of the invention. Communication network 100 may comprise an IMS network or another type of communication network, such as a PSTN or a wireless network. Communication network 100 includes a plurality of network nodes 101-105, a charging system 108, a billing system 110, a network management system 112, and a subscriber database 114. Network nodes 101-105 comprise any elements, systems, or servers in communication network 100 adapted to serve a communication session. If communication network 100 comprises an IMS network, then examples of network nodes 101-105 include a serving-Call Session Control Function (S-CSCF), a proxy-CSCF (P-CSCF), an interrogate-CSCF (I-CSCF), an application server (AS), a Media Gateway Control Function (MGCF), a Breakout Gateway Control Function (BGCF), etc. If communication network 100 comprises a PSTN or a wireless network, then network nodes 101-105 may comprise a switch, an MSC, etc. Billing system 110 comprises any system or server adapted to generate a postpaid bill for communication sessions. Network management system 112 comprises any system or server adapted to control, plan, allocate, deploy, coordinate, and/or monitor the resources of communication network 100. Subscriber database 114 comprises any database or database system that stores subscriber information or subscriber profiles for subscribers of communication network 100. For example, subscriber database 114 may comprise a Home Subscriber Server (HSS) in an IMS network, or may comprise a Home Location Register (HLR) in a wireless network. Communication network 100 may include other networks, systems, or devices not shown in FIG. 1.

Charging system 108 comprises any element, system, or server adapted to interface network nodes 101-105 with billing system 110. Charging system 108 represents a centralized charging system that collects charging information for a session from the different network nodes 101-105. Examples of charging system 108 include a Charging Control Function (CCF) and a Charging Data Function (CDF) as defined by the 3GPP in IMS networks. A CCF, for example, receives charging information from network nodes 101-105 for an IMS session, and generates Charging Data Records (CDR). The CCF then transmits the CDRs to the billing system 110, where billing system 110 correlates the CDRs for the session and calculates a cost for the session using a rating engine.

Figure 2:
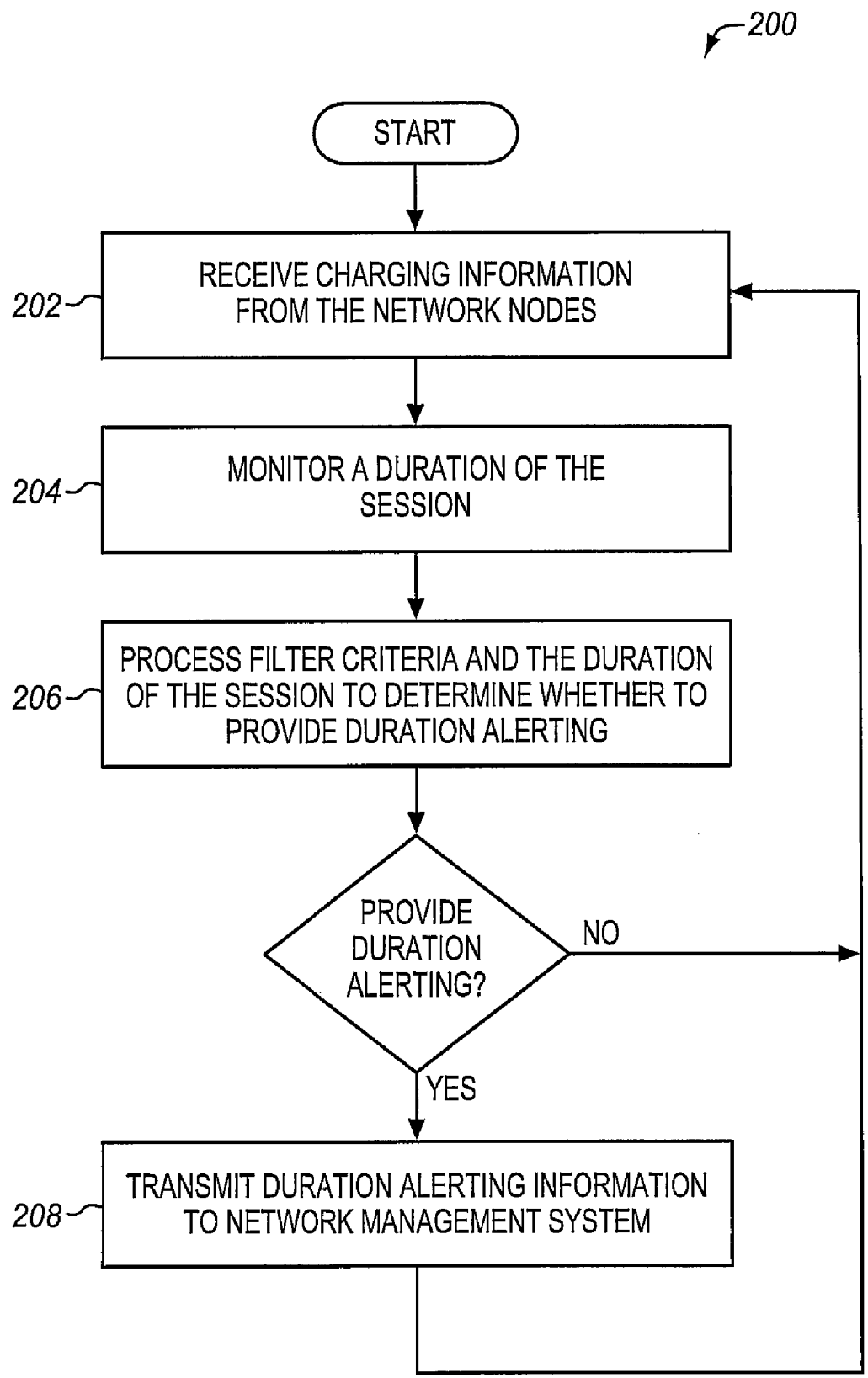
FIG. 2 is a flow chart illustrating a method of operating a charging system to provide duration alerting in an exemplary embodiment of the invention.

According to features and aspects herein, charging system 108 is further adapted to provide duration alerting for sessions as illustrated in FIG. 2. Duration alerting comprises any type of warning, notification, or other type of alerting provided to a subscriber regarding the duration of a session. In this embodiment, charging system 108 includes a monitoring element 122, an alerting element 124, and filter criteria 126.

When a communication session is established in communication network 100, such as an IMS session, a wireless call, etc, for subscriber 116, assume that one or more of network nodes 101-105 serve the session in some fashion. Responsive to serving the session, network nodes 101-105 generate charging information for the session, and transmit the charging information to charging system 108.

FIG. 2 is a flow chart illustrating a method 200 of operating charging system 108 to provide duration alerting in an exemplary embodiment of the invention. The steps of method 200 will be described with reference to communication network 100 in FIG. 1. The steps of the flow chart in FIG. 2 are not all inclusive and may include other steps not shown.

In step 202, monitoring element 122 receives the charging information for the session from network nodes 101-105. In step 204, monitoring element 122 monitors a duration of the session based on the charging information. The duration of the session may represent a length of time for the session, may represent a cost for the session, or may represent some other measurement.

In step 206, alerting element 124 processes filter criteria 126 and the duration of the session to determine whether to provide duration alerting for the session. The filter criteria 126 comprise any data or information defining when to provide duration alerting for sessions. The filter criteria 126 may be defined by subscriber 116 and/or the service provider operating communication network 100. The filter criteria 126 may include but is not limited to a maximum length of a session, a maximum cost of a session, a time of day, a day of the week, a called party address, a calling party address, media for the session, frequency of past sessions (e.g., one day, one week, one month), duration of past sessions, etc.

In one example, if the filter criteria include a maximum length of a session, then alerting element 124 monitors the time-based duration of the session. If the duration of the session reaches the maximum length (time threshold), then alerting element 124 may determine that duration alerting is desired at this time.

In another example, if the filter criteria include a maximum cost of a session, then alerting element 124 queries a rating engine in communication network 100 (not shown in FIG. 1) based on the duration of the session to determine a cost of the session. Alerting element 124 then processes the filter criteria and the cost of the session to determine whether to provide duration alerting for the session. If the cost of the session reaches the maximum cost (cost threshold), then alerting element 124 may determine that duration alerting is desired at this time.

If alerting element 124 determines that duration alerting should be provided, then alerting element 124 transmits duration alerting information to network management system 112 in step 208. The duration alerting information comprises any signal, data, or message indicating that duration alerting should be provided for this session. The duration alerting information may also include the present length of the session, the present cost of the session, or other session information.

Figure 3:
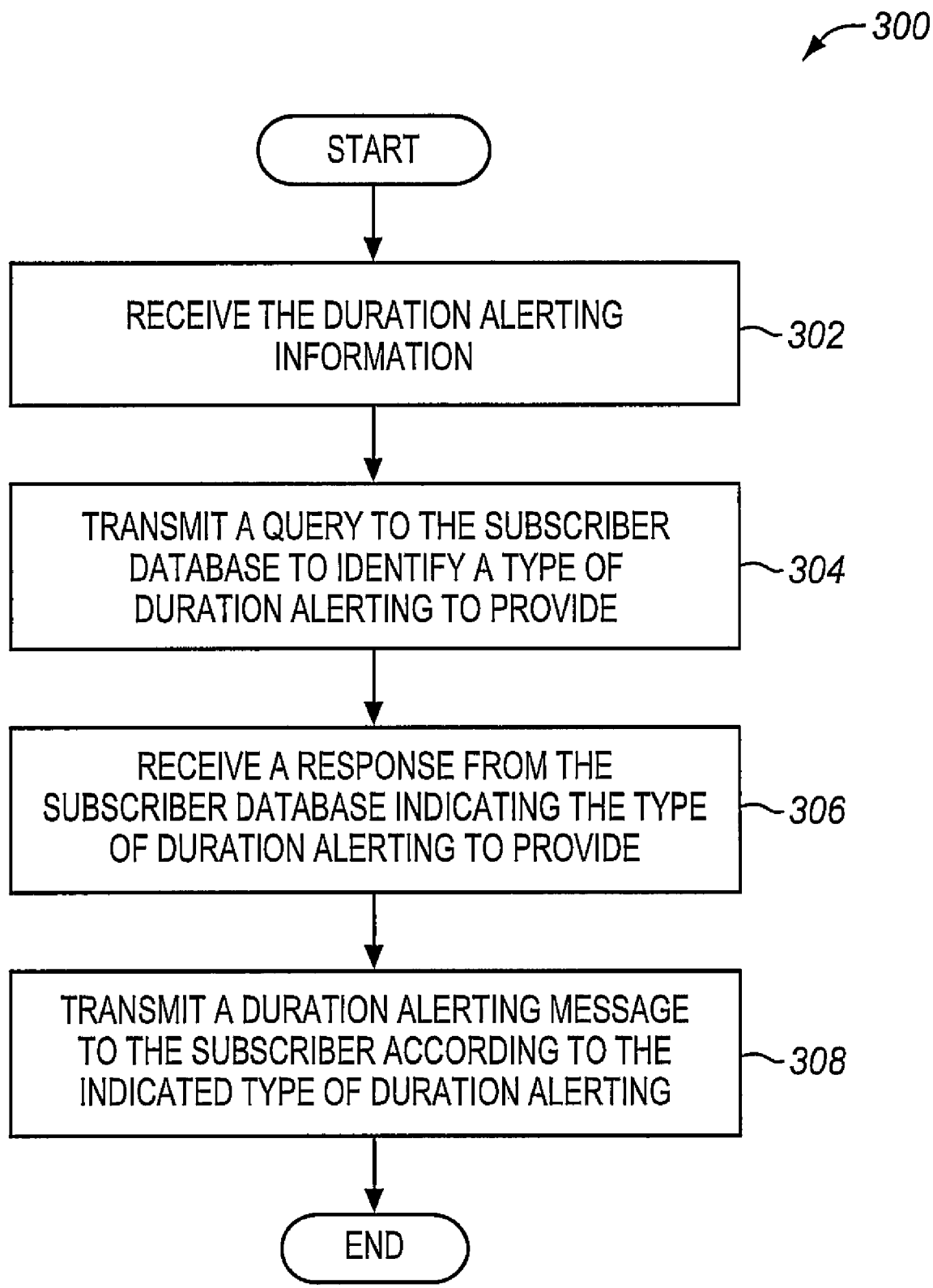
FIG. 3 is a flow chart illustrating a method of operating a network management system to provide duration alerting in an exemplary embodiment of the invention.

FIG. 3 is a flow chart illustrating a method 300 of operating network management system 112 to provide duration alerting in an exemplary embodiment of the invention. The steps of method 300 will be described with reference to communication network 100 in FIG. 1. The steps of the flow chart in FIG. 3 are not all inclusive and may include other steps not shown.

In step 302, network management system 112 is adapted to receive the duration alerting information from charging system 108. In step 304, network management system 112 is adapted to transmit a query to subscriber database 114 to identify a type of duration alerting to provide to the subscriber 116. As previously stated, subscriber database 114 includes a subscriber profile for subscriber 116 that indicates the type of duration alerting subscribed to or defined by subscriber 116. The type of duration alerting may comprise a voice mail message, a text (e.g., SMS) or multimedia (e.g., MMS) message, an email message, an interactive voice message, etc. The type of duration alerting may also indicate the content of the alerting, and identify the recipient(s) of the alerting (e.g., directory number, network address, etc).

In step 306, network management system 112 receives a response from subscriber database 114 indicating the type of duration alerting to provide. In step 308, network management system 112 transmits a duration alerting message to the subscriber 116 according to the indicated type of duration alerting. For instance, the duration alerting message may comprise a voice mail message, a text or multimedia message, an email message, an interactive voice message, etc, depending on the type of duration alerting defined in the subscriber profile. The duration alerting message may also include information on the present session that is the subject of the alert. For instance, the duration alerting message may include a present length of the session, a present cost of the session, or other information on the session.

In addition to providing the duration alerting or as an alternative, network management system 112 may receive a response from subscriber database 114 indicating that the session should be terminated if a particular duration has been reached. Responsive to this type of response from subscriber database 114, network management system 112 may initiate the termination of the session.

Charging system 108 and/or network management system 112 may comprise instructions executable by a processing system to operate as described below to provide the duration alerting. Some examples of instructions are software, program code, and firmware. The instructions are operational when executed by the processing system to direct the processing system to operate in accordance with the invention. The term "processing system" refers to a single processing device or a group of inter-operational processing devices. Some examples of processors are computers, integrated circuits, and logic circuitry.

Figure 4:
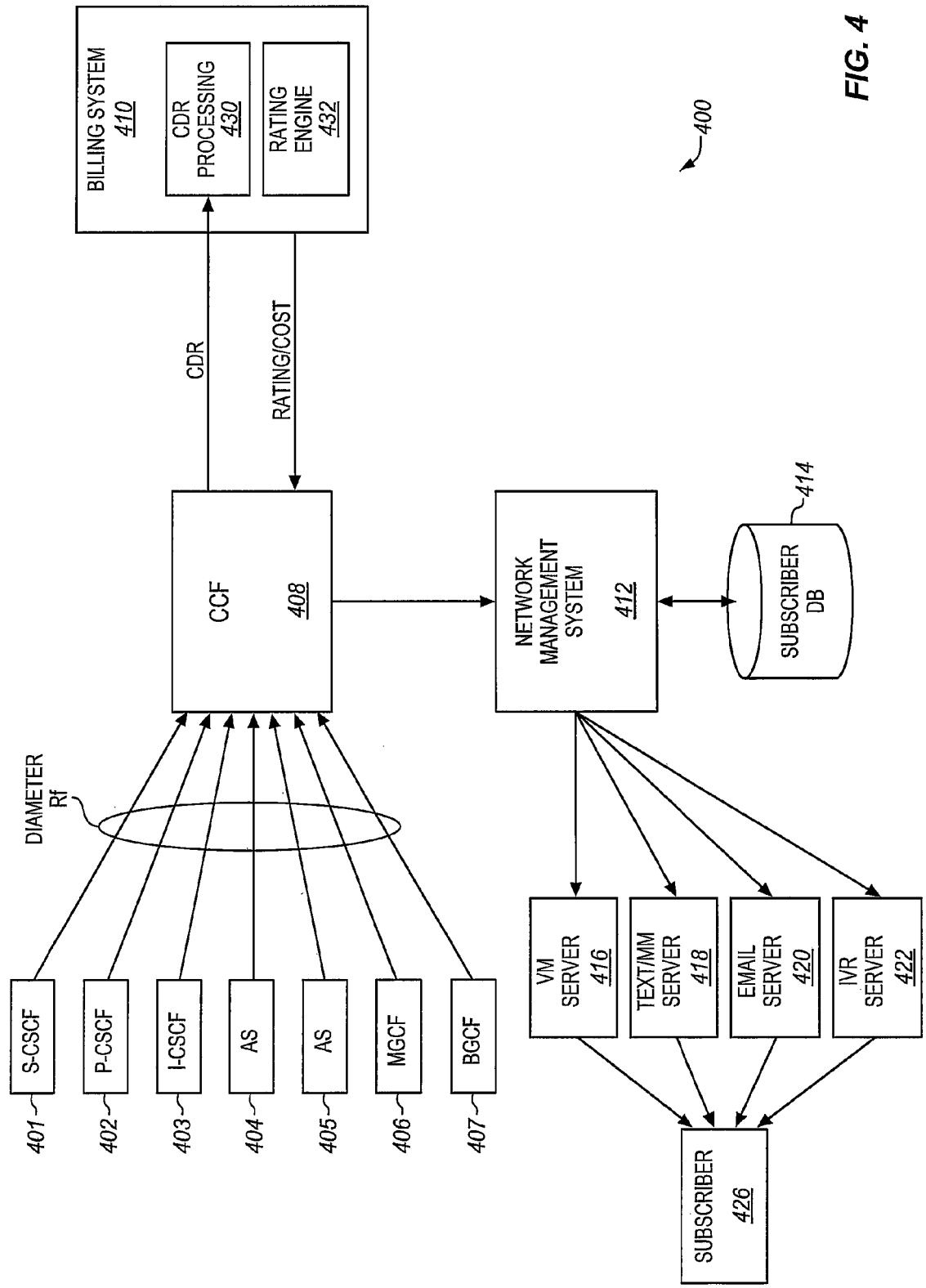
FIG. 4 illustrates an IMS network in another exemplary embodiment of the invention.

FIG. 4 illustrates an IMS network 400 in another exemplary embodiment of the invention. IMS network 400 includes an S-CSCF 401, a P-CSCF 402, an I-CSCF 403, application servers (AS) 404-405, an MGCF 406, a BGCF 407, a CCF 408, a billing system 410, a network management system 412, a subscriber database 414, a voice mail (VM) server 416, a text/multimedia (TEXT/MM) server 418, an email server 420, and an IVR server 422. CCF 408 represents the charging system in this embodiment. IMS network 400 may include other networks, systems, or devices not shown in FIG. 4.

When an IMS session is established in IMS network 400 for IMS subscriber 426, assume that S-CSCF 401, P-CSCF 402, I-CSCF 403, application servers (AS) 404-405, MGCF 406, and BGCF 407 (also referred to as IMS nodes) each serve the IMS session in some fashion. Responsive to serving the IMS session, each IMS node 401-407 generates charging information for the IMS session, and transmits the charging information to CCF 408 over a Diameter Rf interface. The charging information may be in the form of an Accounting Request (ACR) message. The ACR message includes a timestamp, an IMS Charging ID (ICID), a calling party address, a called party address, and the next charging message interval. The ICID is unique for a given session (call) and is used by billing system 410 to correlate CDRs for the session.

Responsive to receiving the ACR messages from the IMS nodes 401-407, CCF 408 processes the ACR message to generate a CDR. The CDR may comprise a complete CDR meaning that the CDR has been generated responsive to the termination of the session. The CDR may also comprise a partial CDR meaning that CDR has been generated mid-session. CCF 408 then transmits the CDR to billing system 410.

Billing system 410 includes a CDR processing element 430 and a rating engine 432. CDR processing element 430 receives the CDR from CCF 408. CDR processing element 430 may correlate the received CDR with other CDRs (if any), and then determine a cost for the session through rating engine 432.

CCF 408 will continually receive ACR messages from the IMS nodes 401-407. Thus, CCF 408 is aware of the status and duration of the session. According to features and aspects herein, CCF 408 is adapted to provide duration alerting for the IMS session. After receiving the ACR message, CCF 408 monitors a duration of the IMS session. For instance, upon receiving an initial ACR message for the session, CCF 408 may set a duration timer. CCF 408 may then monitor the duration timer to determine when to provide duration alerting to the IMS subscriber 426. CCF 408 also processes filter criteria defined by the IMS subscriber 426 and/or the service provider operating IMS network 400. The filter criteria may include but is not limited to a maximum length of a session, a maximum cost of a session, a time of day, a day of the week, a called party address, a calling party address, media for the session, frequency of past sessions (e.g., one day, one week, one month), duration of past sessions, etc. If CCF 408 determines that the duration alerting is proper based on the duration of the IMS session and the filter criteria, then CCF 408 transmits duration alerting information to network management system 412. In other embodiments, CCF 408 may transmit the duration alerting information to other systems in IMS network 400, such as directly to voice mail server 416, text/multimedia server 418, email server 420, or IVR server 422.

As an example, assume that the filter criteria define a maximum length of a session, such as 12 hours. The maximum length of the session represents a time-based threshold for the duration of the IMS session. If CCF 408 determines that the duration timer has reached the threshold, then CCF 408 may initiate duration alerting to IMS subscriber 426, such as by transmitting duration alerting information to network management system 412.

As another example, assume that the filter criteria define a maximum cost of a session, such as 5 dollars for a session. The maximum cost of the session represents a cost-based threshold for the duration of the IMS session. To determine the present cost of the session, CCF 408 may query billing system 410 or another element with a rating engine 432 based on the time represented by the duration timer. CCF 408 may then receive a response from the billing system 410 indicating the present cost for the session. If CCF 408 determines that the present cost of the session has reached the threshold, then CCF 408 may initiate duration alerting to IMS subscriber 426.

Network management system 412 receives the duration alerting information from CCF 408. Network management system 412 transmits a query to subscriber database 414 to identify a type of duration alerting to provide to the IMS subscriber 426. Subscriber database 414, such as an HSS, includes a subscriber profile for IMS subscriber 426 that indicates the type of duration alerting subscribed to or defined by IMS subscriber 426. The type of duration alerting may comprise a voice mail message, a text (e.g., SMS) or multimedia (e.g., MMS) message, an email message, an interactive voice message, etc. The type of duration alerting may also indicate the content of the alerting, and identify the recipient(s) of the alerting (e.g., directory number, network address, etc).

Network management system 412 receives a response from subscriber database 414 indicating the type of duration alerting to provide. Network management system 412 then transmits a duration alerting message to the IMS subscriber according to the indicated type of duration alerting. For instance, if the type of duration alerting comprises a voice mail message, then network management system 412 transmits the duration alerting message to voice mail server 416. IMS subscriber 426 may then retrieve the duration alerting message from his/her voice mailbox. If the type of duration alerting comprises a text/multimedia message, then network management system 412 transmits the duration alerting message to text/multimedia server 418. Text/multimedia 418 then transmits the duration alerting message to IMS subscriber 426. If the type of duration alerting comprises an email message, then network management system 412 transmits the duration alerting message to email server 420. IMS subscriber 426 may then retrieve the duration alerting message from his/her email account. If the type of duration alerting comprises an IVR message, then network management system 412 transmits the duration alerting message to IVR server 422. IVR server 422 then places a call to IMS subscriber 426 through his/her user equipment (UE), and plays the duration alerting message to IMS subscriber 426.

When IMS subscriber 426 receives the duration alerting message, then IMS subscriber 426 may determine how to handle the session. Most likely, if a duration alerting message has been received, the present session is a long duration session. A long duration session comprises any length of session defined by IMS subscriber 426 and/or the service provider. IMS subscriber 426 may terminate the session responsive to the duration alerting message. IMS subscriber 426 may also wait to receive subsequent duration alerting messages before terminating the session.

Billing system 410 may also be configured to provide duration alerting information to network management system 412. CCF 408 transmits CDRs (partial or complete) for the IMS session to billing system 410. Billing system 410 may also be provisioned with filter criteria, and may process the filter criteria and the CDR(s) for the IMS session to determine when to provide duration alerting to IMS subscriber 426. If billing system 410 determines that duration alerting is proper, then billing system 410 transmits duration alerting information to network management system 412.

Figure 5:
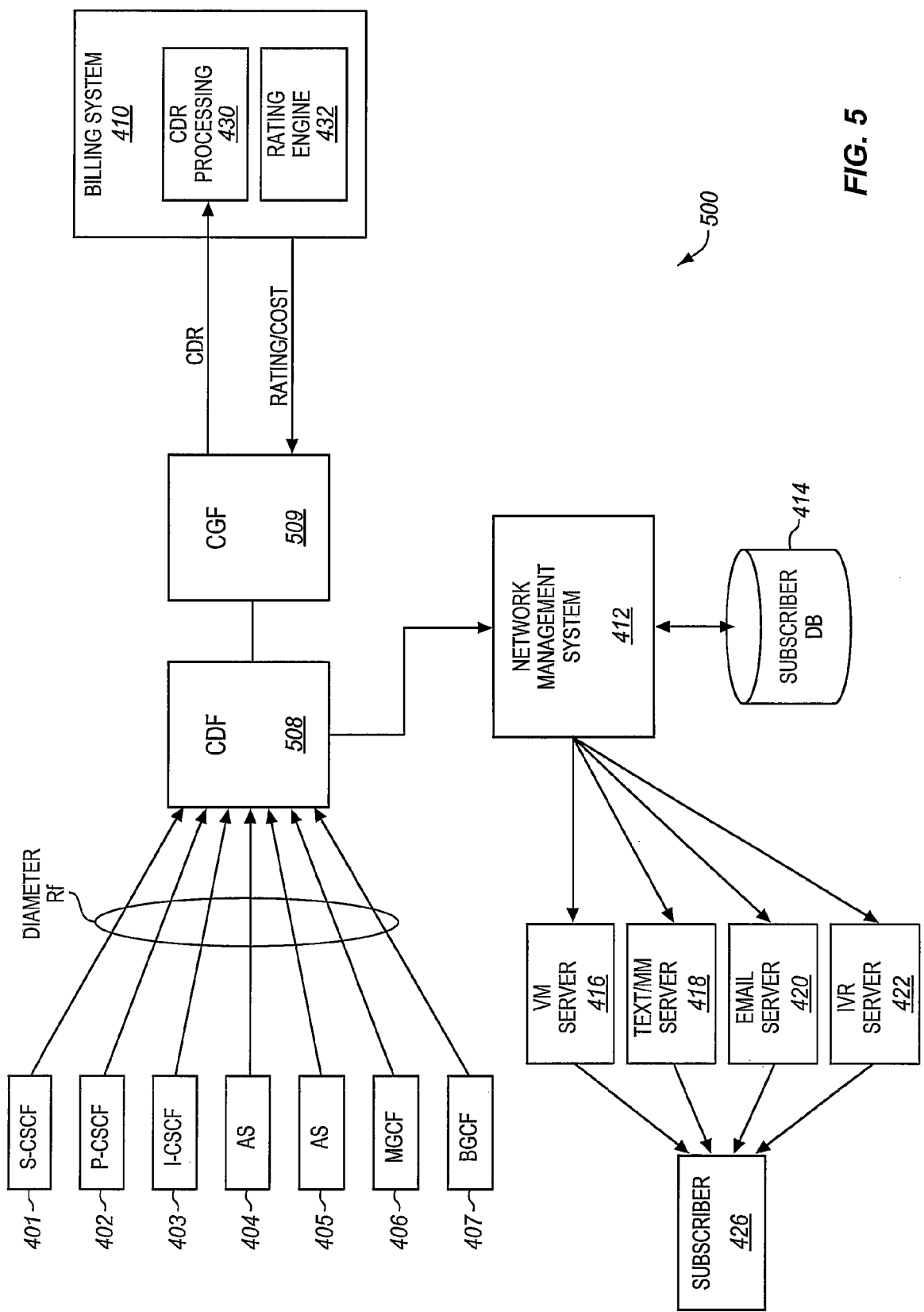
FIG. 5 illustrates an IMS network in another exemplary embodiment of the invention.

FIG. 5 illustrates an IMS network 500 in another exemplary embodiment of the invention. IMS network 500 includes S-CSCF 401, P-CSCF 402, I-CSCF 403, application servers (AS) 404-405, MGCF 406, BGCF 407, a Charging Data Function (CDF) 508, a Charging Gateway Function (CGF) 509, billing system 410, network management system 412, subscriber database 414, voice mail server 416, text/multimedia server 418, email server 420, and IVR server 422. IMS network 500 operates substantially as IMS network 400 described in FIG. 4 except that CDF 508 represents the charging system in FIG. 5 instead of a CCF 408 representing the charging system as in FIG. 4.

Although specific embodiments were described herein, the scope of the invention is not limited to those specific embodiments. The scope of the invention is defined by the following claims and any equivalents thereof.

I claim:

1. A system adapted to provide duration alerting for communication sessions over a communication network, the system comprising:
a charging system adapted to receive charging information from at least one network node serving a session for a subscriber in the form of accounting request messages, and to generate at least one Charging Data Record (CDR) for the session based on the charging information provided in the accounting request messages;
the charging system is further adapted to monitor a duration of the session presently established based on the charging information received in the accounting request messages, to process filter criteria and the duration of the session to determine that the duration of the session presently established reached a threshold defined for long duration sessions, and to transmit duration alerting information to inform the subscriber that the duration of the session presently established has reached the threshold.

2. The system of claim 1 further comprising:
a network management system adapted to receive the duration alerting information, and to transmit a duration alerting message to the subscriber.

3. The system of claim 2 wherein the network management system is further adapted to:
transmit a query to a subscriber database responsive to receiving the duration alerting information to identify a type of duration alerting to provide to the subscriber;
receive a response from the subscriber database indicating the type of duration alerting to provide; and
transmit the duration alerting message to the subscriber according to the indicated type of duration alerting;
wherein the duration alerting message comprises one of a voice mail message, a text/multimedia message, an email message, or an interactive voice message.

4. The system of claim 1 further comprising a rating engine for the session;
wherein the charging system is further adapted to query the rating engine based on the duration of the session to determine a cost of the session, and to process the filter criteria and the cost of the session to determine that the duration of the session presently established reached the threshold.

5. The system of claim 1 wherein the communication network comprises an IMS network and wherein the charging system comprises a 3GPP Charging Control Function (CCF).

6. The system of claim 1 wherein the communication network comprises an IMS network and wherein the charging system comprises a 3GPP Charging Data Function (CDF).

7. The system of claim 1 wherein the filter criteria includes a maximum length of a session.

8. The system of claim 1 wherein the filter criteria includes a maximum cost of a session.

9. The system of claim 2 wherein the network management system is further adapted to terminate the session responsive to receiving the duration alerting information.

10. A method of providing duration alerting for communication sessions, the method comprising:
receiving charging information in a charging system from at least one network node serving a session for a subscriber in the form of accounting request messages;
generating at least one Charging Data Record (CDR) for the session in the charging system based on the charging information provided in the accounting request messages;
monitoring, in the charging system, a duration of the session presently established based on the charging information received in the accounting request messages;
processing filter criteria and the duration of the session to determine that the duration of the session presently established reached a threshold defined for long duration sessions; and
transmitting a duration alerting message to the subscriber to inform the subscriber that the duration of the session presently established has reached the threshold.

11. The method of claim 10 further comprising:
transmitting a query to a subscriber database to identify a type of duration alerting to provide to the subscriber;
receiving a response from the subscriber database indicating the type of duration alerting to provide; and
transmitting the duration alerting message to the subscriber according to the indicated type of duration alerting.

12. The method of claim 11 wherein the duration alerting message comprises one of a voice mail message, a text/multimedia message, an email message, or an interactive voice message.

13. The method of claim 10 further comprising:
   querying a rating engine based on the duration of the session to determine a cost of the session; and
   processing the filter criteria and the cost of the session to determine that the duration of the session presently established reached the threshold.

14. The method of claim 10 wherein the filter criteria includes a maximum length of a session.

15. The method of claim 10 wherein the filter criteria includes a maximum cost of a session.

16. The method of claim 10 further comprising:
   terminating the session based on the filter criteria and the duration of the session.

17. A method of operating a charging system in a communication network to provide duration alerting for communication sessions, the method comprising:
   receiving charging information in the charging system from at least one network node serving a session for a subscriber in the form of accounting request messages;
   generating at least one Charging Data Record (CDR) for the session in the charging system based on the charging information provided in the accounting request messages;
   monitoring, in the charging system, a duration of the session presently in progress based on the charging information received in the accounting request messages;
   processing filter criteria and the duration of the session presently in progress to determine that the duration of the session presently in progress has reached a per-session threshold; and
   initiating duration alerting to the subscriber to inform the subscriber that the duration of the session presently in progress reached the per-session threshold.

18. The method of claim 17 wherein initiating duration alerting comprises:
   transmitting duration alert information to a network management system in the communication network to instruct the network management system to transmit a duration alerting message to the subscriber.

19. The method of claim 17 wherein the per-session threshold includes a maximum length of a session.

20. The method of claim 17 wherein the per-session threshold includes a maximum cost of a session.

* * * * *